US006493756B1

United States Patent
O'Brien et al.

(10) Patent No.: US 6,493,756 B1
(45) Date of Patent: Dec. 10, 2002

(54) SYSTEM AND METHOD FOR DYNAMICALLY SENSING AN ASYNCHRONOUS NETWORK EVENT WITHIN A MODULAR FRAMEWORK FOR NETWORK EVENT PROCESSING

(75) Inventors: Eric David O'Brien, Leesburg, VA (US); James Robert Tryon, Jr., Fremont, CA (US)

(73) Assignee: Networks Associates, Inc., Santa Clara, CA (US)

( * ) Notice: Subject to any disclaimer, the term of this patent is extended or adjusted under 35 U.S.C. 154(b) by 0 days.

(21) Appl. No.: 09/494,234

(22) Filed: Jan. 31, 2000

Related U.S. Application Data

(60) Provisional application No. 60/161,968, filed on Oct. 28, 1999.

(51) Int. Cl.[7] .............................................. G06F 13/00
(52) U.S. Cl. ...................................... 709/224; 709/223
(58) Field of Search ................................ 709/200, 201, 709/205, 206, 217, 218, 219, 220, 223, 224

(56) References Cited

U.S. PATENT DOCUMENTS

| | | | | |
|---|---|---|---|---|
| 5,696,701 A | * | 12/1997 | Burgess et al. | 709/200 |
| 5,758,071 A | * | 5/1998 | Burgess et al. | 709/205 |
| 5,796,633 A | * | 8/1998 | Burgess et al. | 709/209 |
| 6,065,039 A | * | 5/2000 | Paciorek | 709/202 |
| 6,163,794 A | * | 12/2000 | Lange et al. | 709/202 |

OTHER PUBLICATIONS

"Patrol 3.3—Advanced Enterprise Management and Control—Data Sheet," BMC Software, http://www.bmc.com/rs–bin/RightSite/getcontent/bmcdoc.html!dmw_objectid=090032018011c73e&dmw_format=html, 2000.

"HP Open View Extensible SNMP Agent—Product Brief," Hewlett Packard, Jun. 1996.

\* cited by examiner

*Primary Examiner*—Moustafa M. Meky
(74) *Attorney, Agent, or Firm*—Patrick J. S. Inouye; Christopher J. Hamaty

(57) ABSTRACT

A system and a method for dynamically sensing an asynchronous network event within a modular framework for network event processing are described. An occurrence of asynchronous network events is sensed on one or more network event sensors. Each such sensor implements a common interface via which the sensor can be connected to the modular framework. At least one port over which can be received a message from a network agent indicating the occurrence of a network event is passively monitored. The message includes event data pertinent to the network event. The message is received over the at least one port via a listener thread and staged into a holding structure within which can be placed a plurality of received messages. Each received message is iteratively removed from the holding structure via a handler thread. An action set mapping corresponding to each received message is retrieved and an action set is generated from the action set mapping via a generator process. The generated action set is enqueued onto an event queue. Each generated action set is processed by invoking a process method on the generated action set next identified for processing within the event queue. The process method is repeated for any further generated action sets in the event queue.

24 Claims, 8 Drawing Sheets

SYSTEM AND METHOD FOR DYNAMICALLY SENSING AN ASYNCHRONOUS NETWORK EVENT WITHIN A MODULAR FRAMEWORK FOR NETWORK EVENT PROCESSING

CROSS-REFERENCE TO RELATED APPLICATION

This patent application claims priority under 35 U.S.C. §119(e) to provisional patent application Ser. No. 60/161,968, filed Oct. 28, 1999, the disclosure of which is incorporated herein by reference.

FIELD OF THE INVENTION

The present invention relates in general to network event management and, in particular, to a system and method for dynamically sensing an asynchronous network event within a modular framework for network event processing.

BACKGROUND OF THE INVENTION

Information networks interconnecting a wide range of computational resources have become a mainstay of corporate enterprise computing environments. Typically, several host computer systems are interconnected internally over an intranetwork to which individual workstations and network resources are connected. These intranetworks, also known as local area networks (LANs), make legacy databases and information resources widely available for access and utilization throughout the corporation. These same corporate resources can also be interconnected to wide area networks (WANs), including public information internetworks such as the Internet, to enable internal users access to remote computational resources, such as the World Wide Web, and to allow outside users access to select corporate resources for the purpose of completing limited transactions or data transfer.

Structurally, these corporate networks generally are made up of a set of localized, often heterogeneous, subnetworks interconnected through a series of routers, hubs, bridges, gateways, and similar devices. Managing these subnetworks and the network as a whole has become increasingly complex and difficult as the size and topology of networks have grown. The Simple Network Management Protocol (SNMP), described generally in W. Stallings, "SNMP, SNMPv2, SNMPv3, and RMON 1 and 2," Chs. 1–4, Addison Wesley Longman (1999), the disclosure of which is incorporated herein by reference, defines a standardized framework of managers and agents for managing TCP/IP-based networks. Under the SNMP scheme, each manager is responsible for managing all or part of the network on behalf of network management applications and users. In turn, each agent, also known as a sensor or listener, is responsible for collecting and maintaining local management information and delivering that information to one of the managers through messages in the form of SNMP traps or in response to a polling request by the manager. Note the functionality of an agent can also be incorporated directly into a manager.

A wide range of SNMP-compatible, manager/agent point products are presently available to meet various network management and security needs, such as applications for monitoring network performance and availability and pro-actively detecting network security vulnerabilities. One such application is the Sniffer Total Network Visibility (TNV) product, licensed by Network Associates, Inc., Santa Clara, Calif. By way of example, the Sniffer TNV product identifies network performance and security concerns through remote agents. A central manager analyzes the information collected by the remote agents and can generate a log file for use in identifying network fault and performance areas of interest. While useful for managing and troubleshooting enterprise computing environments, the Sniffer TNV manager is a dedicated application tied to a specific set of remote agents with whom the manager communicates via SNMP traps for indicating events unique to vendor specific network equipment.

Similarly, the OpenView product suite, licensed by Hewlett Packard Company, Palo Alto, Calif., provides a modular manager which responds to SNMP traps for use in legacy computing environments. The Open View manager reports and can log the receipt of network events and includes an application programming interface (API) into which can be written plug-in actor applications. Likewise, the PATROL product, licensed by BMC Software, Houston, Tex., provides a management infrastructure for providing proactive monitoring and management of enterprise-wide computational resources through one or more SNMP managers. PATROL Knowledge Modules containing application-specific intelligence can be deployed to servers for reporting parameters and management options back to manager consoles.

The foregoing SNMP-based products represent specialized vertical products focused on resolving a particularized problem through vendor specific means. None provide a generic interface capable on interconnecting remote agents to actors via a centralized management framework. More specifically, there is no ability to flexibly and cooperatively integrate a plurality of heterogeneous manager/agent point products or response mechanisms into a single centralized manager. For instance, each of the products can generate a log file specific to their respective interface, yet the log files are in non-uniform, proprietary formats which require analysis and management separate from other point products.

Therefore, there is a need for an approach to providing a modular framework for sensing network events in a distributed computing environment. Such a modular framework would preferably export a standardized interface into which a plurality of heterogeneous agents and sensors could be integrated in a flexible "plug-in" fashion. There is a further need for a modular framework flexibly supporting active and passive agent/sensor modules, each of which can include one or more control threads for receiving or sensing the occurrence of network events.

SUMMARY OF THE INVENTION

The present invention provides a system and method for dynamically sensing an asynchronous network event within a modular framework for network event processing. Sensors can flexibly be "plugged in" to a centralized network event management framework for sensing the occurrence of network events. Action sets define relationships between the network events and actions and event filters which can be executed in a prioritized fashion.

An embodiment of the present invention is a system and a method for dynamically sensing an asynchronous network event within a modular framework for network event processing. An occurrence of asynchronous network events is sensed on one or more network event sensors. Each such sensor implements a common interface via which the sensor can be connected to the modular framework. At least one port over which can be received a message from a network agent indicating the occurrence of a network event is passively monitored. The message includes event data pertinent to the network event. The message is received over the at least one port via a listener thread and staged into a holding structure within which can be placed a plurality of received messages. Each received message is iteratively removed from the holding structure via a handler thread. An action set mapping corresponding to each received message is retrieved and an action set is generated from the action set mapping via a generator process. The generated action set is enqueued onto an event queue. Each generated action set is processed by invoking a process method on the generated action set next identified for processing within the event queue. The process method is repeated for any further generated action sets in the event queue.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
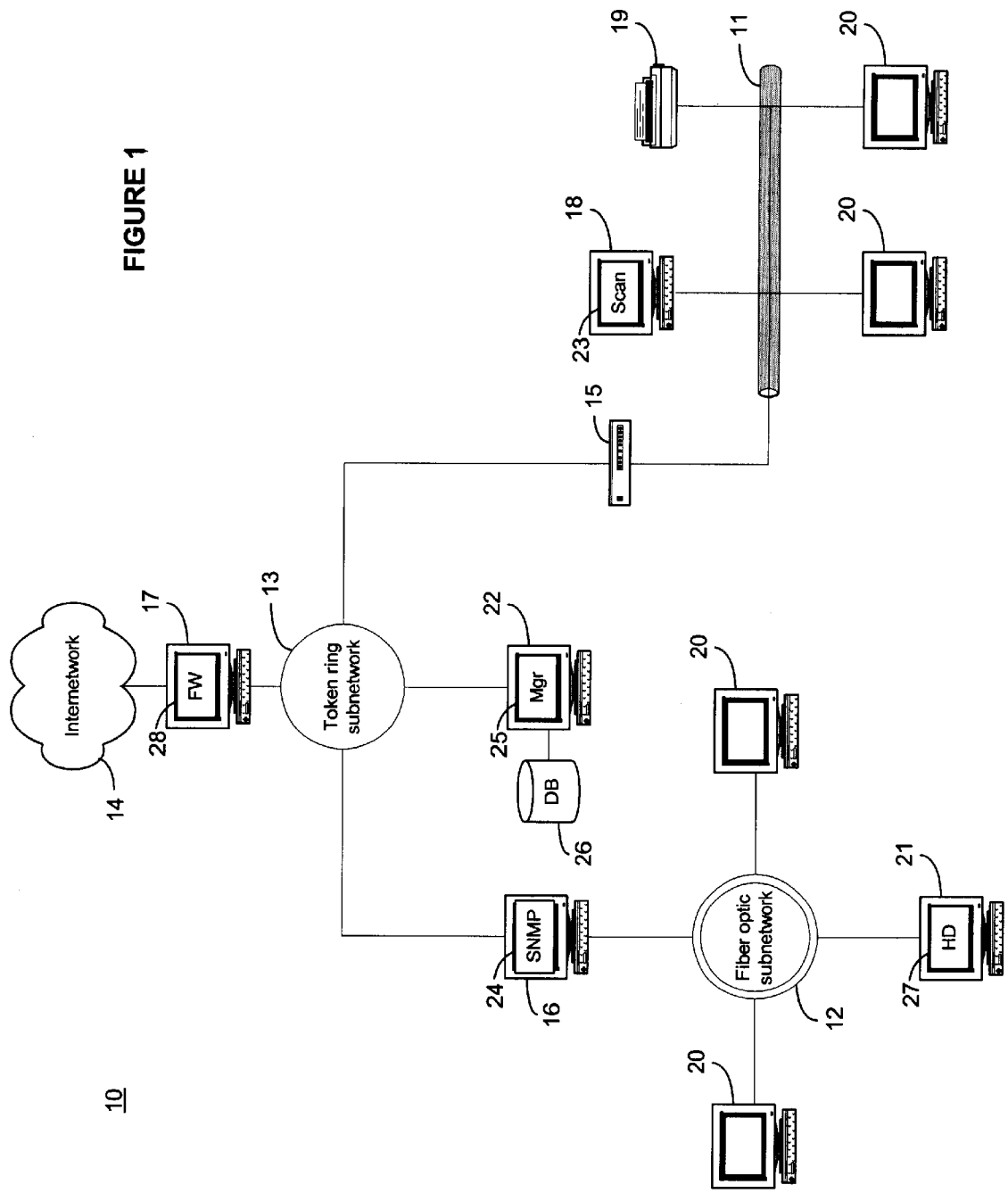
FIG. 1 is a functional block diagram showing a system for dynamically sensing an asynchronous network event within a modular framework for network event processing in accordance with the present invention.

FIG. 1 is a functional block diagram showing a system 10 for dynamically sensing an asynchronous network event within a modular framework for network event processing in accordance with the present invention. By way of example, a plurality of subnetworks, including an Ethernet subnetwork 11, a fiber optic subnetwork 12, and a token ring subnetwork 13, are interconnected using a bridge 15 and a router (operating on workstation 16). The token ring subnetwork 13 is interconnected to an internetwork 14, such as the Internet, using a gateway (operating on workstation 17). In addition to the foregoing network-related components, each subnetwork includes individual computational resources. For instance, the Ethernet subnetwork 11 includes a workstation 18 configured as an active security scanner (Scan) 23, a printer 19, and a pair of workstations 20. The fiber optic subnetwork includes a set of workstations 20, a workstation 21 configured as a help desk 27, and the workstation 16 further configured as a Simple Network Management Protocol (SNMP)-capable agent 24. Finally, the token ring subnetwork includes a workstation 22 configured as a network manager (Mgr) 25 with a dedicated database (DB) 26 on a secondary storage device and the workstation 17 further configured as a firewall (FW) 28. An example of a firewall 28 suitable for use in the present invention is the Gauntlet Firewall product, licensed by Network Associates, Inc., Santa Clara, Calif. Other network topologies and configurations of computational resources are feasible.

The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage. In the described embodiment, the subnetworks 11, 12, 13 and internetwork 14 implement a Transmission Control Protocol/Internet Protocol (TCP/IP) network stack protocol implementation.

Figure 2:
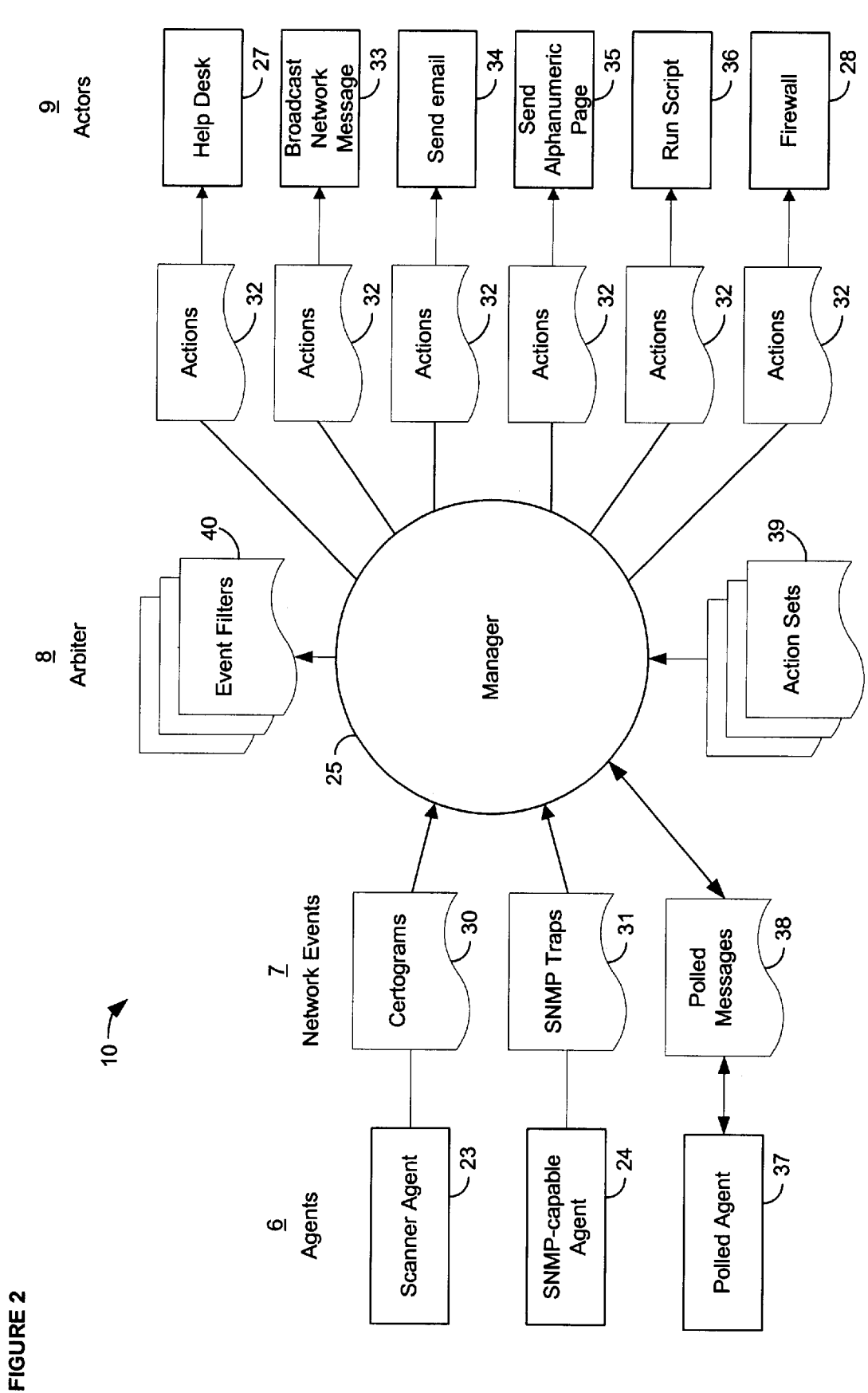
FIG. 2 is a process diagram showing the flow of network events and actions through the system of FIG. 1.

FIG. 2 is a process diagram showing the flow of processing through the system 10 of FIG. 1. Generally, there are three categories of components: agents 6, arbiter 8, and actors 9. The agents 6 generate network events 7 and the arbiter 8 maps the network events 7 to actions 32 which are performed by the actors 9. Network events 7 could be any type of state or condition which could be monitored and reported to the arbiter 8. Moreover, any of the agents 6 or actors 9 could be within the arbiter 8, on the same system 10 as the arbiter 8, or on another system remote from the arbiter 8.

In the described embodiment, the arbiter 8 is simply the manager 25. In addition, two types of agents, by way of example, are used, an active security scanner agent 23 and an SNMP-capable network management agent 24, although other types of agents could also be used. The scanner agent 23 sends security messages, known as "certograms" 30, notifying the arbiter 8 of the occurrence of network security and integrity concerns. The SNMP agent 24 sends SNMP traps 31 similarly notifying the arbiter 8 of the occurrence of network management concerns. The certograms 30 are sent with Transport Layer Security via TCP packets, as further described below. The SNMP traps 31 are sent in User Datagram Protocol (UDP) datagrams.

These two agents, scanner agent 23 and SNMP agent 24, actively report ("push") network events 7 to the manager 25. The network events 7 are received by the manager 25 through a sensor (not shown) assigned to receive each specific type of network event 7. The certogram and SNMP trap sensors used by manager 25 are further described below in FIG. 3. Alternatively, the manager 25 could poll the agents ("pull") for the occurrence of network events 7 via polling messages 38 exchanged with a polled agent 37 from a sensor (not shown) internal to the manager 25. For instance, a polling sensor for monitoring the availability of a Web site by periodically sending a "GET" request via a Hypertext Transport Protocol (HTTP) message. In reply, the Web server would effectively respond as an "agent" by sending an HTML page. Other configurations of interconnections for monitoring and polling between various types of agents and the manager are possible, as is known in the art.

In response to the receipt of the network event notification, the manager 25 determines the action set 39 to which the network event 7 is associated using a stored set of event mappings. Each of these action sets 39 group one or more actions 32 and one or more optional event filters 40. If appropriate, the manager 25 causes an actor 9 to perform some task by dispatching an appropriate action 32.

More specifically, the agents 6 sense the occurrence of network events 7. As an example, SNMP-capable agent 24 can generate two basic types of network events 7, generic and specific, which are properly referred to as "SNMP traps." Generic SNMP traps are commonly used and supported by all vendors. There are six generic traps: cold start, warm start, link down, link up, authorization failure, and neighbor loss. Specific SNMP traps are proprietary traps implemented by vendors to indicate the occurrence of events specific to their devices and must be defined in the Management Information Base (MIB) supplied with their hardware. An agent must have a copy of a vendor-specific MIB to interpret specific SNMP traps.

In the described embodiment, two types of agents are used. The active security scanner agent 23 proactively analyzes the security and integrity of the network and reports any vulnerabilities to the manager 25 over an authenticated communications channel using specialized messages known as certograms 30. An example of a commercially available active security scanner agent 23 is included with the Cybercop Scanner product suite also licensed by Network Associates, Inc., Santa Clara, Calif. The SNMP-capable agent 24 monitors network performance and load characteristics. An example of a commercially available SNMP agent 24 is included with the Sniffer Total Network Visibility product suite also licensed by Network Associates, Inc. Both the SNMP agent 24 and active security scanner 18 can be implemented as either dedicated devices or as a part of the function provided by network resources.

The arbiter 8 manages the receipt, analysis, and processing of network events 7 based on user-defined action sets 39. Each action set 39 defines relationships between network events 7, actions 32 and event filters 40. Actions 32 are performed by actors 9 and are described below. Event filters 40 are actions which are performed after the receipt of a network event 7 but before any corresponding actions 32 are executed.

In the described embodiment, a network event 7 could be either a standard SNMP trap 31 or a specialized trap or notification, such as a certogram 30. In addition, three types of event filters are used, Visual Basic scripts, frequency thresholds, and adding custom values to the event or action based on SNMP values before the trap is forwarded to an action 32. Other forms of network events, actions and event filters are feasible as is known in the art.

The mapping of network events 7 to actions 32 is performed in an action set-centric fashion which ensures that any network event 7 may cause at least one corresponding action to occur. Each of the items associated with, in the case of a network event 7, or stored in, in the case of an event filter 40 or action 32, an action set 32 can have a many-to-many relationship to any other network event 7, event filter 40 or action 32 through participation in other action sets 39. Modular frameworks for dynamically processing network events using action sets and for configuring action sets are respectively disclosed in the related, commonly-assigned U.S. patent application Ser. No. 09/467,730, filed Dec. 20, 1999, pending; and U.S. patent application Ser. No. 09/467,633, filed Dec. 20, 1999, pending, the disclosures of which are incorporated herein by reference. An example of a commercially available manager 25 is the Event Orchestrator product suite also licensed by Network Associates, Inc.

The actors 9 take actions in response to instructions from the arbiter 8. In the described embodiment, six types of actors are supported, a help desk 27, firewall 28, and methods for broadcasting a network message 33, sending an electronic mail message (email) 34, sending an alphanumeric page 35, and running a script 36. Other types of actors and actions are feasible. The methods could be performed by the same system as the manager 25 or by another remote system depending upon the definition of the action. Agents, arbiter, and actors are further described in "Event Orchestrator for Windows NT—Getting Started Guide," Rel. 1.02, Network Associates, Inc. (Jan. 1999), the disclosure of which is incorporated herein by reference.

Figure 3:
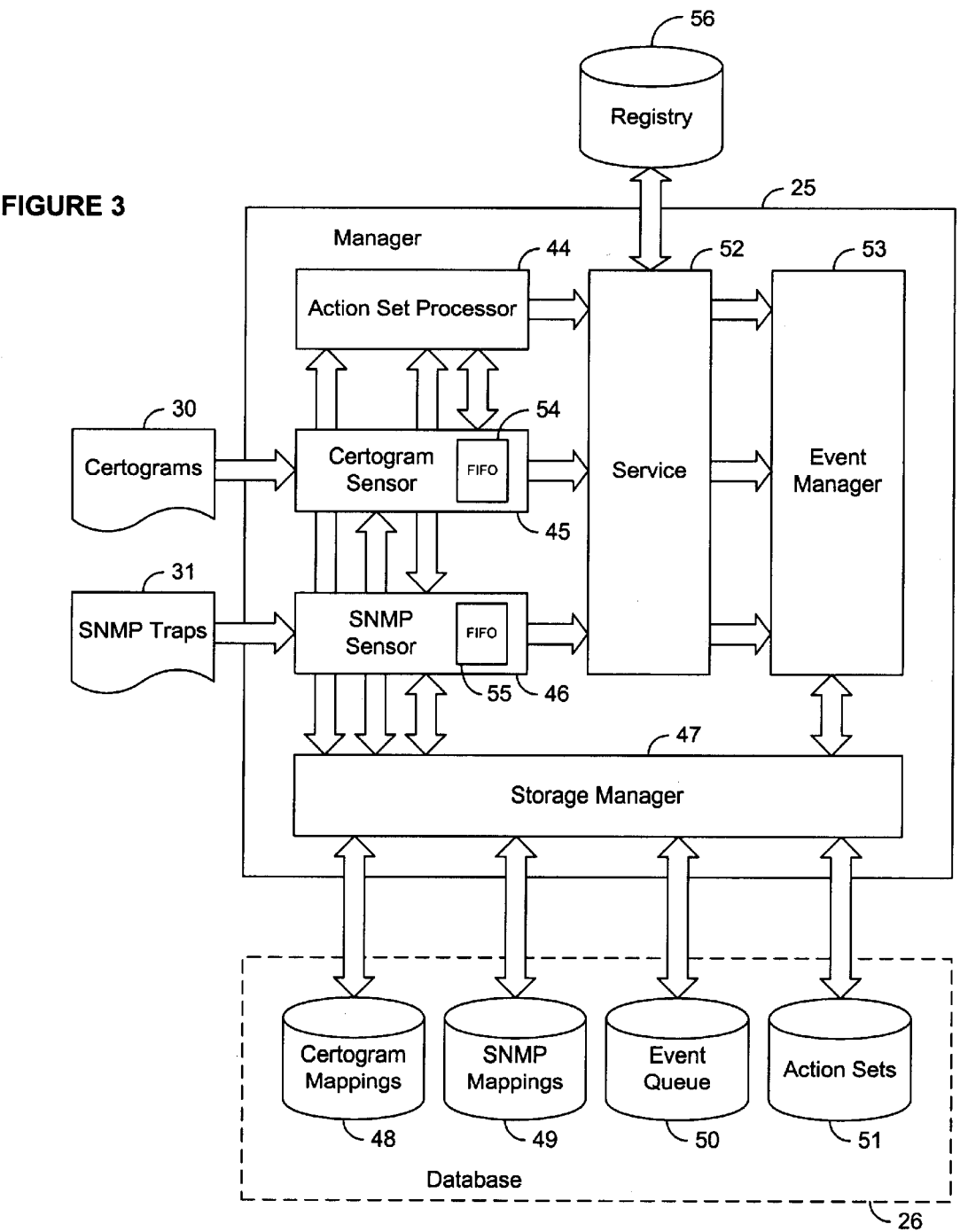
FIG. 3 is a block diagram showing the functional software modules of the manager of the system of FIG. 1.

FIG. 3 is a block diagram showing the functional software modules of the manager 25 of the system 10 of FIG. 1. Each module is a computer program written as source code in a conventional programming language, such as C++ and Visual Basic programming languages, and is presented for execution by the CPU as object or byte code, as is known in the art. The various implementations of the source code and object and byte codes can be held on a computer-readable storage medium or embodied on a transmission medium in a carrier wave. In the described embodiment, the software modules are written in accordance with the Common Object Model (COM), such as described in D. Chappell, "Understanding ActiveX and OLE," Chs. 1–5, Microsoft Press (1996), the disclosure of which is incorporated herein by reference.

The manager 25 comprises six main modules: action set processor 44, certogram sensor 45, SNMP sensor 46, storage manager 47, service 52, and event manager 53. As primary inputs, the manager 25 receives notifications of the occurrence of network events 7 by means of certograms 30 and SNMP traps 31. The mappings for network events 7, queued "events," that is, generated action sets, and action sets 39 are stored in the database 26. Each of these components will now be described more fully.

The certogram sensor 45 receives certograms 30 from active security agents, such as scanner agent 23, via an authenticated communications link as part of a secure Transport Layer Security connection. Active security monitors and protects the security and integrity of an unattended network through proactive analysis and by reporting to the manager 25 any suspicious or abnormal activities, such as break-in attempts or forged instructions to shut down a system. Thus, for security reasons, all communications between the system 10 and the scanner agent 23 are authenticated using digital certificates generated by a public key infrastructure (PKI) server (not shown). In the described embodiment, X.509 digital certificates are used. In particular, certograms 30 received from the scanner agent 23 can cause the manager 25 to generate action sets 39 defining the actions to ultimately be taken by the firewall 28 in response to a security alert from the scanner agent 23. As further described below with respect to FIG. 5, the certogram sensor 45 is internally structured into three concurrently executable routines, a listener thread, a handler thread, and a generator process. The certogram sensor 45 maintains an internal first-in-first-out (FIFO) list 54 within which can be stored formatted strings containing certogram data transitorily staged for processing by the handler thread.

The SNMP sensor 46 receives SNMP traps from SNMP agents, such as SNMP-capable agent 24, via communications links which need not be authenticated. The SNMP standard defines an application-level protocol for remotely managing TCP/IP networks by representing individual network resources as objects. Individual SNMP messages are exchanged between agent and manager using User Datagram Protocol (UDP) datagrams. The agents can be controlled through the modification of the values of specific variables maintained in a Management Information Base (MIB) (not shown), as is known in the art. Upon the occurrence of certain network events 7, the SNMP agent 24 generates a trap which is sent via a UDP datagram to the manager 25. As further described below with respect to FIG. 7, the SNMP sensor 46, like the certogram sensor 45, is internally structured into three concurrently executable routines, a listener thread, a handler thread, and a generator process. The SNMP sensor 46 maintains an internal first-in-first-out (FIFO) list 55 within which can be stored SNMPTrap objects containing SNMP trap data transitorily staged for processing by the handler thread.

The action set processor 44 processes generated action sets, also called events, which have been generated by the generator processes of the certogram sensor 45 and SNMP sensor 46. Certogram and SNMP trap data is communicated to the action set processor 44 from the sensors via a "mailslot." A mailslot is an interprocess broadcast messaging channel supported by the Windows NT operating system. As further described below with respect to FIG. 8, the action set processor 44 is internally structured into two concurrently executable routines, a processor thread and processor process.

The storage manager 47 is responsible for performing all accesses to the database 26 (shown in FIG. 1). All other processes, including the action set processor 44, certogram sensor 45, SNMP sensor 46, and event manager 53, must coordinate database requests through the storage manager 47. Individual items stored in the database 26 are stored as storage objects which are analogous to tables in conventional databases. The database 26 consists of four principal storage objects, certogram mappings 48, SNMP mappings 49, event queue 50, and actions sets 51.

Certogram mappings 48 and SNMP mappings 49 are sets of event mappings which identify the action sets 39 associated with a particular sensor. One set of event mappings per sensor is required. Certogram mappings 48 and SNMP mappings 49 are event mappings which store the mappings of action sets 39 to network events 7, as identified by their respective sensor, certogram sensor 45 and SNMP sensor 46.

The event mappings are configured in an action set-centric manner, meaning an action set must be defined before any network event, event filter, or action can be defined. Each event mapping is referenced by a mapping key. For certograms 30, each event mapping is referenced by sensor and vulnerability. For SNMP traps 31, each event mapping is referenced by object identifier (OID), plus generic and specific identifiers. The OID identifies the particular source of the network event 7 by network address. The Generic identifier specifies whether the particular network event 7 is a known and expected event or whether the network event 7 is specific to the vendor of the agent from which the network event 7 originated. If so, the definition for the Specific identifier must be obtained from the MIB supplied with the network device. Other types of sensors may have unique mapping key formats.

The event queue 50 stores generated mad processed action sets. Generated action sets are enqueued in the event queue 50 in order of occurrence and severity. In the described embodiment, each action set is assigned a severity which indicates the general criticality of the network event 7. The action set is placed in the event queue 50 in a location higher than other action sets already in the queue but having a lesser severity. Thus, action sets 39 with the highest severity are processed before action sets 39 with lower severities, even if those lower severity action sets 39 have been enqueued for a longer period of time. The approach ensures that action sets 39 requiring the most attention, that is, having the highest severity, are processed as expeditiously as possible.

Each action set 39 is associated with a network event 7 via a mapping table, can store (embed) one or more actions 32, and can reference one or more event filters 40. Moreover, actions sets 39 can be "chained" to invoke subsequent action sets. However, to "link" an network event 7 to some action requires at least one action set 39 in the chain to be associated with at least one network event 7 and at least one action set 39 to embed at least one action 32.

The remaining modules of the manager 25 work in parallel to process network events 7 and actions 32. The service 52 provides a common service interface to sensors, including certogram sensor 45 and SNMP sensor 46, such that additional sensors can be implemented in a plug-in manner. The event manager 53 is a top level component which functions as a component server for providing components to other objects within the manager 25. For instance, when a sensor, such as SNMP sensor 46, requires access to the corresponding mapping table, SNMP mappings 49, the SNMP sensor 46 requests the storage object for the table from the event manager 25. Generated action sets are placed in the event queue 50 for processing. The functions performed by the manager 25, including the action set processor 44, certogram sensor 45, and SNMP sensor 46, are further described below in more detail beginning with reference to FIG. 5.

Figure 4:
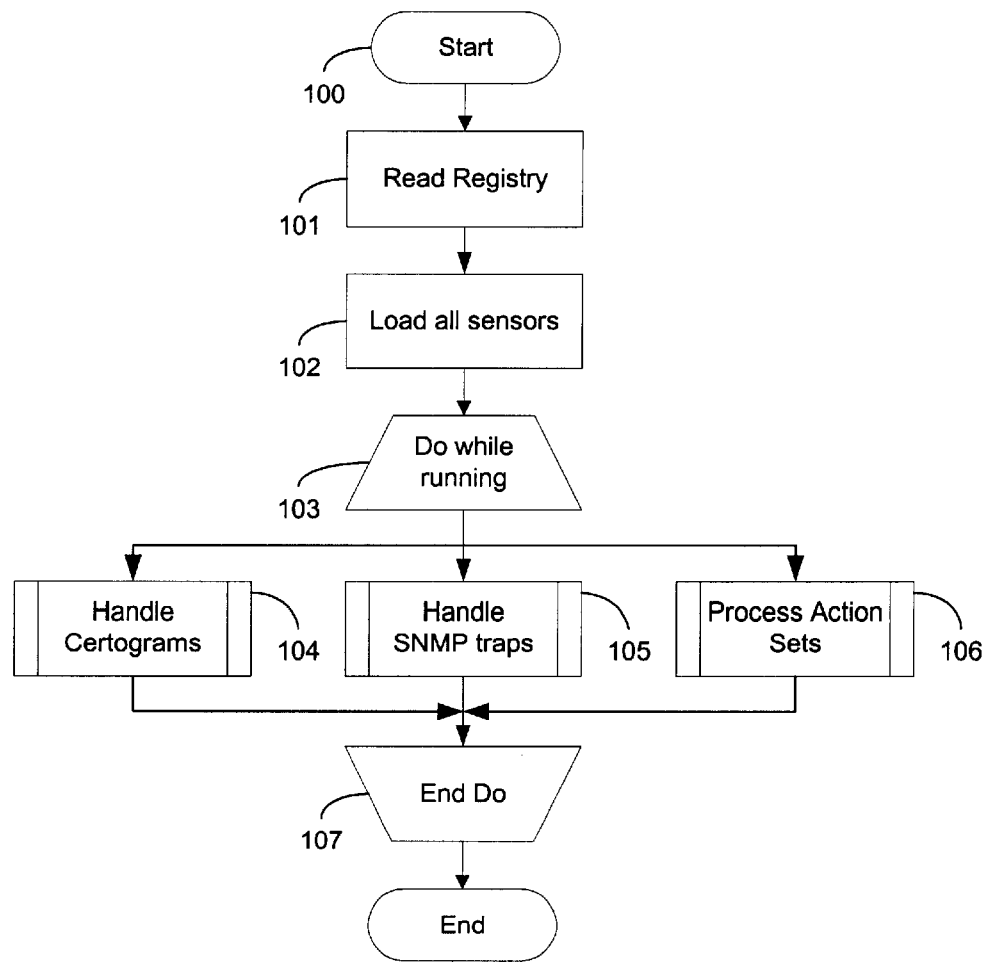
FIG. 4 is a flow diagram showing a method for dynamically sensing an asynchronous network event within a modular framework for network event processing in accordance with the present invention.

FIG. 4 is a flow diagram showing a method 100 for dynamically sensing an asynchronous network event within a modular framework for network event processing in accordance with the present invention. The method proceeds in two phases, an initialization phase (blocks 101–102) and an iterative processing phase (blocks 103–107). The initialization phase is performed at system startup.

Initialization begins with the service 52 reading the Registry 56 (shown in FIG. 3) to determine which sensors are available (block 101). All available sensors are then loaded (block 102). In the described embodiment, the service 52 is configured as a Windows NT service which is automatically performed upon system startup. The action set processor 44 and each of the sensors, certogram sensor 45 and SNMP sensor 46, are in-process COM objects implemented with an IEMEComponent interface. This interface exposes two primary methods. IEMEComponent::Start( ) and IEMEComponent::Stop( ) respectively start and stop any of the threads implemented by the sensor. For example, in the SNMP sensor 46, IEMEComponent::Start( ) creates a listener thread, which registers with the SNMP library as an SNMP trap handler, and an event handler thread. EEMEComponent::Stop( ) signals and waits for the threads to stop. Note each sensor can implement one or more listener threads, optionally configured as a thread pool, or have no listener thread, such as in the case of a sensor configured to perform active polling.

Processing is performed through a continuous processing loop (blocks 103–107) which is executed to concurrently run the routines for handling certograms (block 104), handling SNMP traps (block 105) and processing action sets (block 106). Each of these routines include an independent thread of execution which launches a child process whenever work needs to be performed. The handle certogram (block 104), handle SNMP traps (block 105), and process action sets (block 106) routines are further described below with reference to FIGS. 5, 7, and 8, respectively. Execution of each processing thread (blocks 103–107) continues until the system 100 is shutdown, whereupon the method ends.

Figure 5:
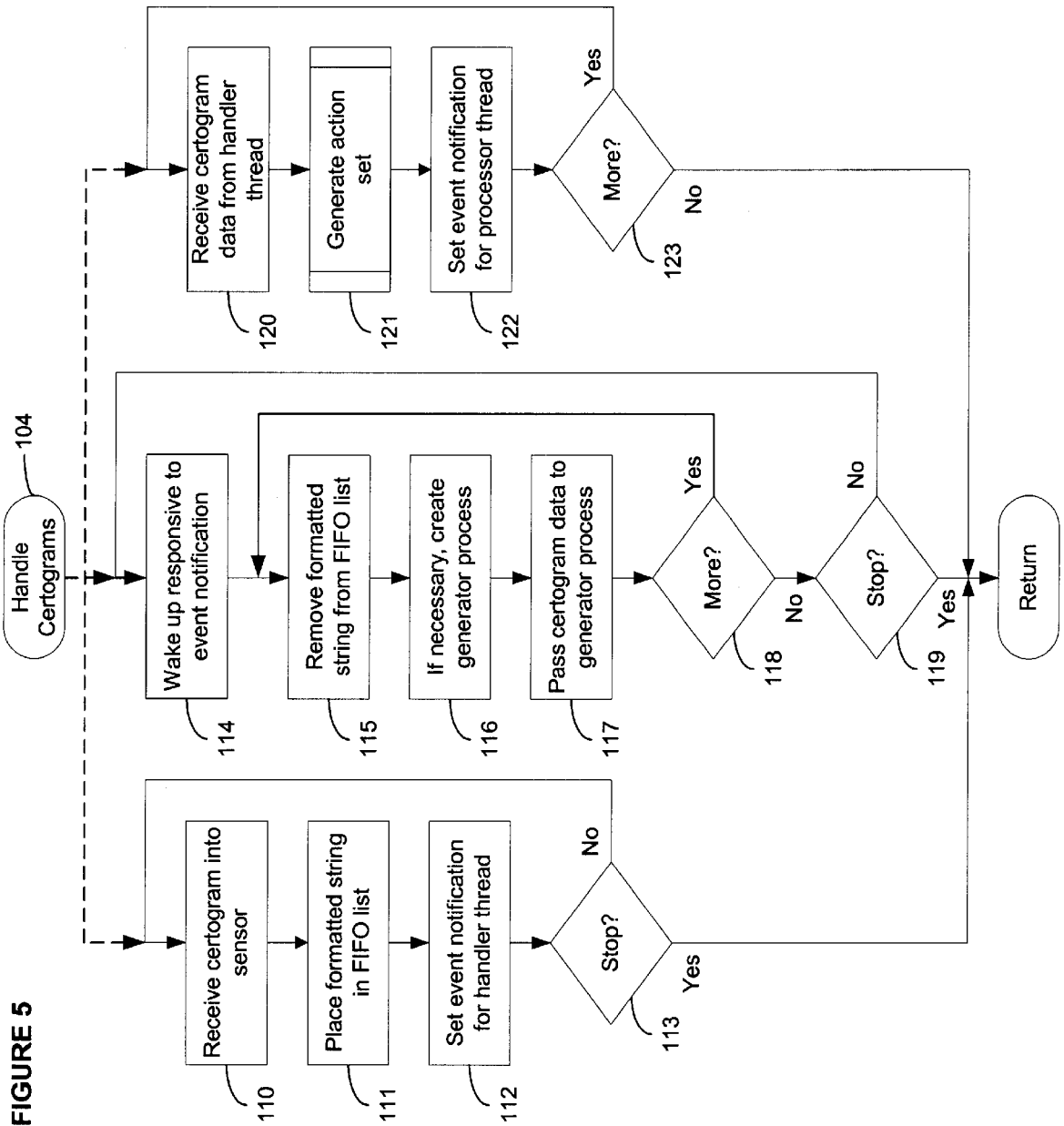
FIG. 5 is a flow diagram showing the routine for handling certograms for use in the method of FIG. 4.

FIG. 5 is a flow diagram showing the routine for handling certograms 104 for use in the method of FIG. 4. The purpose of this routine is to receive and process certograms 30 (shown in FIG. 2) and to generate action sets 39 mapped thereto. There are three sets of related, concurrently executable routines which can be grouped as follows. A listener thread (blocks 110–113) receives certograms. A handler thread (blocks 114–119) launches a generator process as necessary. The generator process (blocks 120–123) generates action sets. These routines preferably execute concurrently, thereby enabling each phase of the event lifecycle to run at full throttle without blocking another part of the event generation process. Certogram data is communicated from the listener thread (blocks 110–113) to the handler thread (blocks 114–119) by means of the FIFO list 54 (shown in FIG. 3). In turn, the certogram data is further communicated from the handler thread to the generator process (blocks 120–123) by means of a mailslot which is a form of connectionless, broadcast messaging channel supported by Windows NT.

The listener thread (blocks 110–113) receives certograms 30 (block 110) over an authenticated communications link. The received certogram is formatted into a text string and placed into the FIFO list 54 (block 111). The handler thread (blocks 114–119) is then notified by the sensor (block 112) to begin the action set generation process for this certogram 30. The listener thread (blocks 110–113) continues receiving certograms 30 until instructed to stop (block 113), whereupon the routine returns.

The handler thread (blocks 114–119) wakes up responsive to the event notification (block 114) sent by the listener thread (blocks 110–113). The formatted string containing the certogram 30 is removed from the FIFO list 54 (block 115). If necessary, the generator process (blocks 120–123) is launched (block 116) and the certogram data is passed along (block 117). The handler thread continues processing formatted strings (blocks 115–118) off of the FIFO list 54 until no further formatted strings remain (block 118). Finally, the handler thread (blocks 114–119) continues waking up until instructed to stop (block 119), whereupon the routine returns.

Figure 8:
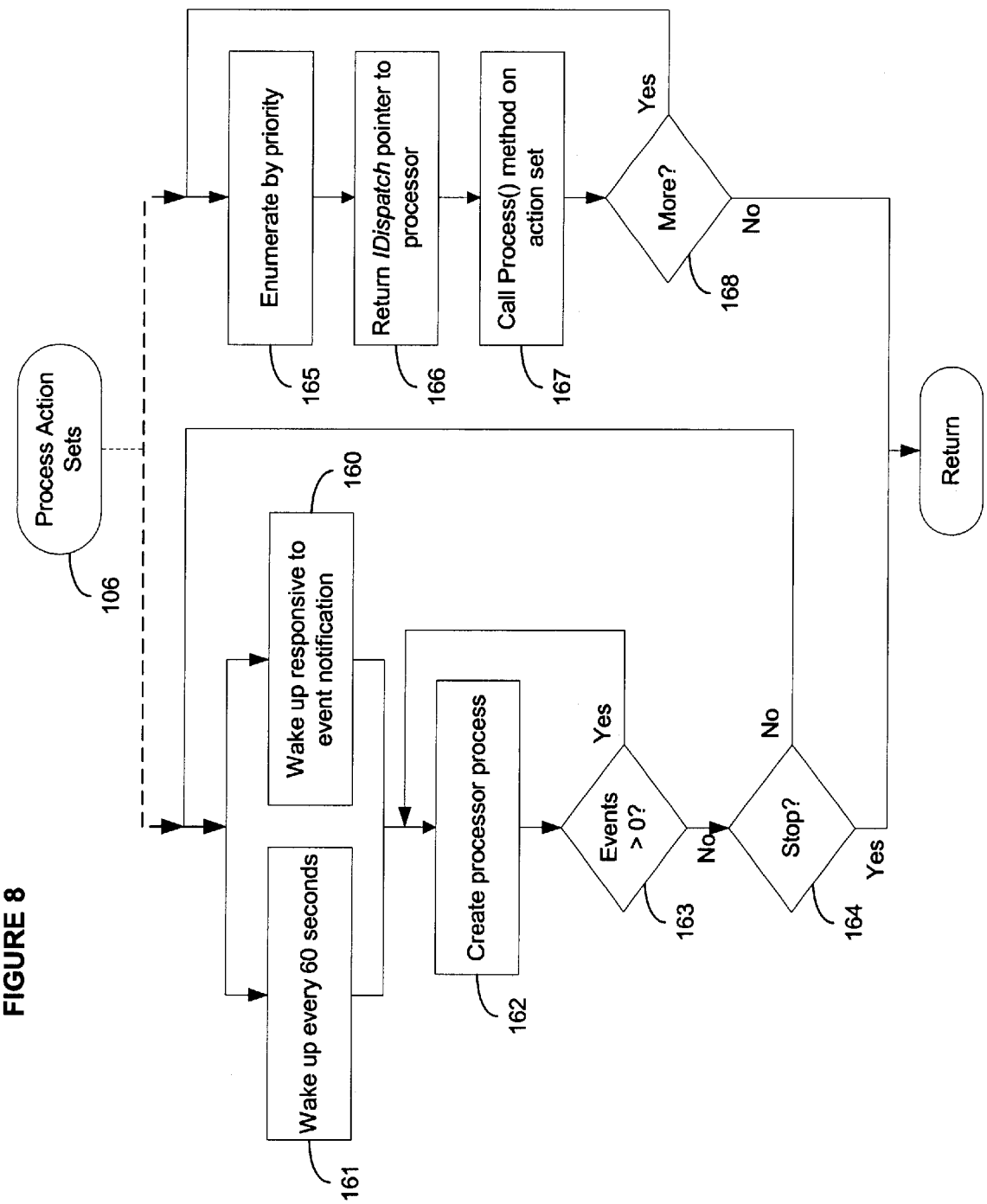
FIG. 8 is a flow diagram showing the routine for processing action sets for use in the method of FIG. 4.

Finally, the generator process (blocks 120–123) generates at least one action set beginning with the receipt of certogram data (block 120) as communicated by the handler thread (blocks 114–119). As described above, the storage manager 47 houses the database 26 and handles all database access requests. An action set mapping corresponding to the certogram 30 is retrieved from the certogram mappings 48, which is then used to generate an action set (block 121), as further described below with reference to FIG. 6. The generated action set is placed in the event queue 50 and the processor thread, as implemented through the process action sets routine 106 and further described below with reference to FIG. 8, is notified (block 122). The generator process (blocks 120–123) continues generating action sets until no further action sets remain (block 123), whereupon the routine returns.

Figure 6:
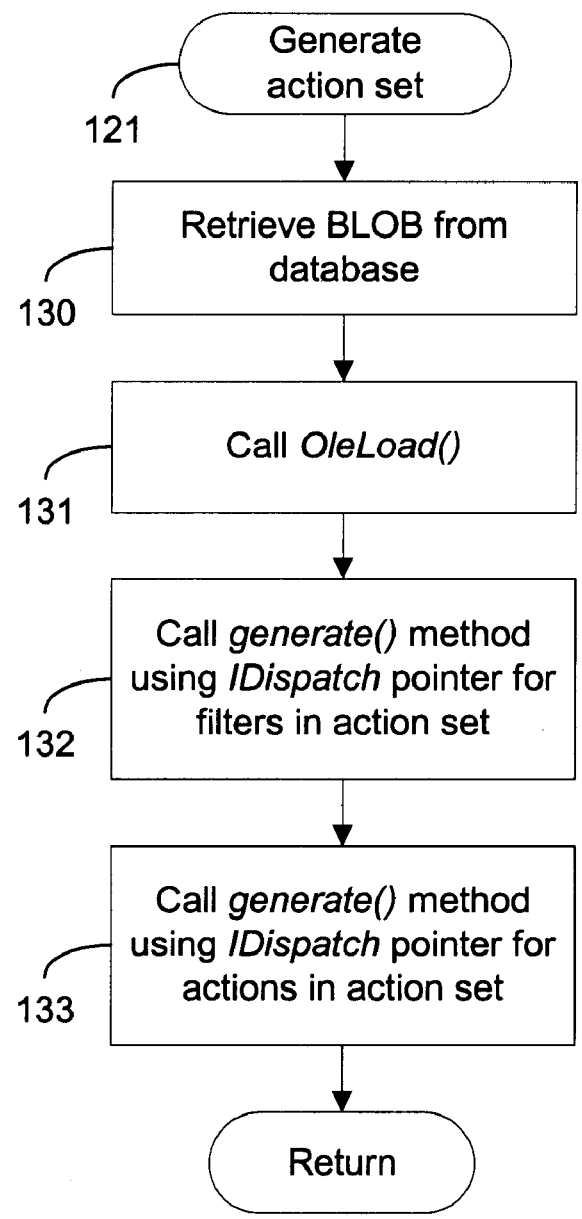
FIG. 6 is a flow diagram showing the routine for generating an action set for use in the routines of FIGS. 5 and 7.
Figure 7:
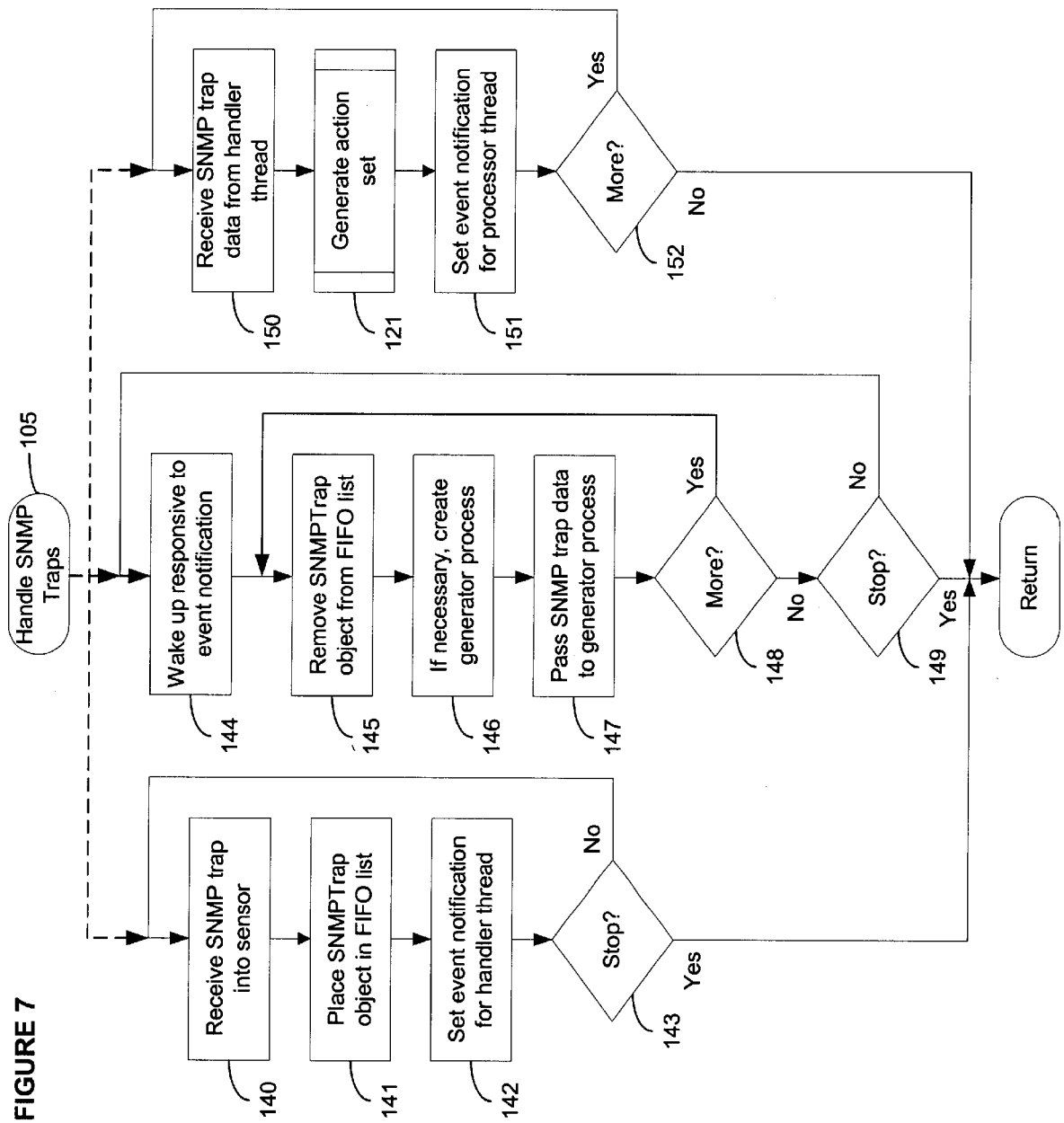
FIG. 7 is a flow diagram showing the routine for handling SNMP traps for use in the method of FIG. 4.

FIG. 6 is a flow diagram showing the routine for generating an action set 121 for use in the routines of FIGS. 5 and 7. The purpose of this routine is to create an instance of an action set. Using the action set mapping previously retrieved by the storage manager 47, a binary large object (BLOB) for the action set 39 is retrieved from the actions sets 51 (within the database 26) by the storage manager 47 (block 130). Each action set 39 can embed one or more actions 32 and can reference one or more event filters 40 using a BLOB storage structure. Upon receipt of the BLOB, a call is made to an OleLoad( ) method (block 131) from which an IDispatch pointer is received. The generate( ) method is called using the IDispatch pointer previously received when the action set was instantiated for each event filter (block 132) and action (block 133) in the action set 39. The generation of an event results in at least one generated action set being placed into the event queue 50 (by the storage manager 47) according to the severity of the action set and length of the event queue 50. In the described embodiment, the manager 25 is notified of the occurrence of network events by the certogram sensor 45 and SNMP sensor 46 through the generation of an internal event rather than having to rely on the polling of individual agents, althrough the architecture of the manager 25 also allows for event polling. The routine then returns.

FIG. 7 is a flow diagram showing the routine for handling SNMP traps 105 for use in the method of FIG. 4. The purpose of this routine is to receive and process SNMP traps 31 (shown in FIG. 2) and to generate action sets 39 mapped thereto. Similar to the routine for handling certograms 104, described above, there are three sets of related, concurrently executable routines which can be grouped as follows. A listener thread (blocks 140–143) receives SNMP traps 31. A handler thread (blocks 144–149) launches a generator process as necessary. The generator process (blocks 150–152) generates action sets. These routines also preferably execute concurrently. SNMP trap data is communicated from the listener thread (blocks 140–143) to the handler thread (blocks 144–149) by means of the FIFO list 55 (shown in FIG. 3). In turn, the SNMP trap data is further communicated from the handler thread to the generator process (blocks 150–152) by means of a further mailslot.

The listener thread (blocks 140–143) receives SNMP traps 31 (block 140). The received SNMP trap is stored into an instance of the SNMPTrap object class and placed into the FIFO list 55 (block 141). The handler thread (blocks 144–149) is then notified by the sensor (block 142) to begin the action set generation process for this SNMP trap 31. The listener thread (blocks 140–143) continues receiving SNMP traps 31 until instructed to stop (block 143), whereupon the routine returns.

The handler thread (blocks 144–149) wakes up responsive to the event notification (block 144) sent by the listener thread (blocks 140–143). The SNMPTrap object containing the SNMP trap 31 is removed from the FIFO list 55 (block 145). If necessary, the generator process (blocks 150–152) is launched (block 146) and the SNMP trap data is passed along (block 147). The handler thread continues processing SNMPTrap objects (blocks 145–148) off of the FIFO list 55 until no further objects remain (block 148). Finally, the handler thread (blocks 144–149) continues waking up until instructed to stop (block 149), whereupon the routine returns.

Finally, the generator process (blocks 150–152) generates at least one action set beginning with the receipt of SNMP trap data (block 150) as communicated by the handler thread (blocks 144–149). As described above, the storage manager 47 houses the database 26 and handles all database access requests. An action set mapping corresponding to the SNMP trap 31 is retrieved from the SNMP mappings 49, which is then used to generate an action set (block 121), as described above with reference to FIG. 6. The generated action set is placed in the event queue 50 and the processor thread, as implemented through the process action sets routine 106 and further described below with reference to FIG. 8, is notified (block 151). The generator process (blocks 150–152) continues generating action sets until no further action sets remain (block 152), whereupon the routine returns.

FIG. 8 is a flow diagram showing the routine for processing action sets 106 for use in the method of FIG. 4. The purpose of this routine is to process the action sets generated by the certogram sensor 45 and SNMP sensor 46. There are two sets of related, concurrently executable routines which can be grouped as follows. A processor thread (blocks 160–164) launches a processor process as necessary. The processor process (blocks 165–168) process action sets.

The processor thread (blocks 160–164) wakes up in one of two ways. First, if the generator process for one of the sensors has set an event notification, the processor thread (blocks 160–164) wakes up in response thereto (block 161). Otherwise, the processor thread (blocks 160–164) periodically wakes up, in the described embodiment, once about every 60 seconds (block 161). After having been awaken, the processor process (blocks 165–168) is created as necessary (block 162). The processor thread monitors the execution of the processor process (blocks 165–168) and, if upon completion of the processing of the current set of events, more events remain to be processed (block 163), another processor process (blocks 165–168) is created. The processor process (blocks 160–164) continues waking up and creating the processor process until instructed to stop (block 164), whereupon the routine returns.

The processor process (blocks 165–168) processes the generated action sets, also referred to as events, stored in the event queue 50. As each action set is processed, the event is enumerated by a pre-assigned priority (block 165) and the associated IDispatch pointer is returned to the processor (block 166). The process ( ) method is called on the action set (block 167). The processor process (blocks 165–168) continues processing action sets until no further action sets remain (block 169), whereupon the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for dynamically sensing an asynchronous network event within a modular framework for network event processing, comprising:
   one or more network event sensors each sensing an occurrence of asynchronous network events and implementing a common interface via which the sensor can be connected to the modular framework, each sensor comprising:
      at least one passively monitored port over which can be received a message from a network agent indicating the occurrence of a network event, the message including event data pertinent to the network event;
      a listener thread receiving the message over the at least one port;
      a holding structure staging the received message and within which can be placed a plurality of received messages;
      a handler thread iteratively removing each received message from the holding structure; and
   a generator process retrieving an action set mapping corresponding to each received message, generating an action set from the action set mapping and enqueueing the generated action set onto an event queue; and
   an action set processor processing each generated action set by invoking a process method on the generated action set next identified for processing within the event queue and repeating the process method for any further generated action sets in the event queue.

2. A system according to claim 1, wherein the sensor further comprises a plurality of listener threads, further comprising:
   a thread pool comprised of the plurality of listener threads; and
   the handler thread iteratively removing each received message from the holding structure for each listener thread in the thread pool.

3. A system according to claim 1, wherein at least one such network event sensor is an authenticated sensor, further comprising:
   a secure connection formed between the at least one network agent and the authenticated sensor; and
   the listener thread receiving the message over the secure connection upon authentication of the at least one network agent and the authenticated sensor.

4. A system according to claim 3, wherein the authenticated sensor is a certogram sensor and the secure connection is effected via a Transport Layer Security connection.

5. A system according to claim 1, wherein at least one such network event sensor is an SNMP-capable sensor, further comprising:
   the listener thread receiving an SNMP trap from the at least one network agent.

6. A system according to claim 1, wherein at least one such network event sensor is a polling sensor, further comprising:
   the listener thread periodically sending a polling message from the polling sensor and sensing the occurrence of a network event via a reply message received by the polling sensor responsive to the polling message.

7. A system according to claim 1, further comprising:
   the action set processor pre-assigning a priority to each generated action set and enumerating the generated action sets within the event queue in order of pre-assigned priority.

8. A system according to claim 1, wherein the holding structure is a First-In-First-Out (FIFO) list.

9. A system according to claim 1, wherein the common interface is COM-compliant.

10. A method for dynamically sensing an asynchronous network event within a modular framework for network event processing, comprising:
   sensing an occurrence of asynchronous network events on one or more network event sensors, each such sensor implementing a common interface via which the sensor can be connected to the modular framework, comprising:
      passively monitoring at least one port over which can be received a message from a network agent indicating the occurrence of a network event, the message including event data pertinent to the network event;
      receiving the message over the at least one port via a listener thread and staging the received message into a holding structure within which can be placed a plurality of received messages;

iteratively removing each received message from the holding structure via a handler thread;

retrieving an action set mapping corresponding to each received message and generating an action set from the action set mapping via a generator process; and enqueueing the generated action set onto an event queue; and processing each generated action set, comprising:

invoking a process method on the generated action set next identified for processing within the event queue; and repeating the process method for any further generated action sets in the event queue.

11. A method according to claim 10, wherein the sensor further comprises a plurality of listener threads, further comprising:

forming a thread pool comprised of the plurality of listener threads; and iteratively removing each received message from the holding structure for each listener thread in the thread pool.

12. A method according to claim 10, wherein at least one such network event sensor is an authenticated sensor, further comprising:

forming a secure connection between the at least one network agent and the authenticated sensor; and receiving the message over the secure connection upon authentication of the at least one network agent and the authenticated sensor.

13. A method according to claim 12, wherein the authenticated sensor is a certogram sensor and the secure connection is effected via a Transport Layer Security connection.

14. A method according to claim 10, wherein at least one such network event sensor is an SNMP-capable sensor, further comprising:

receiving an SNMP trap from the at least one network agent.

15. A method according to claim 10, wherein at least one such network event sensor is a polling sensor, further comprising:

periodically sending a polling message from the polling sensor; and sensing the occurrence of a network event via a reply message received by the polling sensor responsive to the polling message.

16. A method according to claim 10, further comprising:

pre-assigning a priority to each generated action set; and enumerating the generated action sets within the event queue in order of pre-assigned priority.

17. A method according to claim 10, wherein the holding structure is a First-In-First-Out (FIFO) list.

18. A method according to claim 10, wherein the common interface is COM-compliant.

19. A computer-readable storage medium holding code for dynamically sensing an asynchronous network event within a modular framework for network event processing, comprising:

sensing an occurrence of asynchronous network events on one or more network event sensors, each such sensor implementing a common interface via which the sensor can be connected to the modular framework, comprising:

passively monitoring at least one port over which can be received a message from a network agent indicating the occurrence of a network event, the message including event data pertinent to the network event;

receiving the message over the at least one port via a listener thread and staging the received message into a holding structure within which can be placed a plurality of received messages;

iteratively removing each received message from the holding structure via a handler thread;

retrieving an action set mapping corresponding to each received message and generating an action set from the action set mapping via a generator process; and enqueueing the generated action set onto an event queue; and processing each generated action set, comprising:

invoking a process method on the generated action set next identified for processing within the event queue; and repeating the process method for any further generated action sets in the event queue.

20. A storage medium according to claim 19, wherein the sensor further comprises a plurality of listener threads, further comprising:

forming a thread pool comprised of the plurality of listener threads; and iteratively removing each received message from the holding structure for each listener thread in the thread pool.

21. A storage medium according to claim 19, wherein at least one such network event sensor is an authenticated sensor, further comprising:

forming a secure connection between the at least one network agent and the authenticated sensor; and receiving the message over the secure connection upon authentication of the at least one network agent and the authenticated sensor.

22. A storage medium according to claim 19, wherein at least one such network event sensor is an SNMP-capable sensor, further comprising:

receiving an SNMP trap from the at least one network agent.

23. A storage medium according to claim 19, wherein at least one such network event sensor is a polling sensor, further comprising:

periodically sending a polling message from the polling sensor; and sensing the occurrence of a network event via a reply message received by the polling sensor responsive to the polling message.

24. A storage medium according to claim 19, further comprising:

pre-assigning a priority to each generated action set; and enumerating the generated action sets within the event queue in order of pre-assigned priority.

* * * * *